Patented May 25, 1948

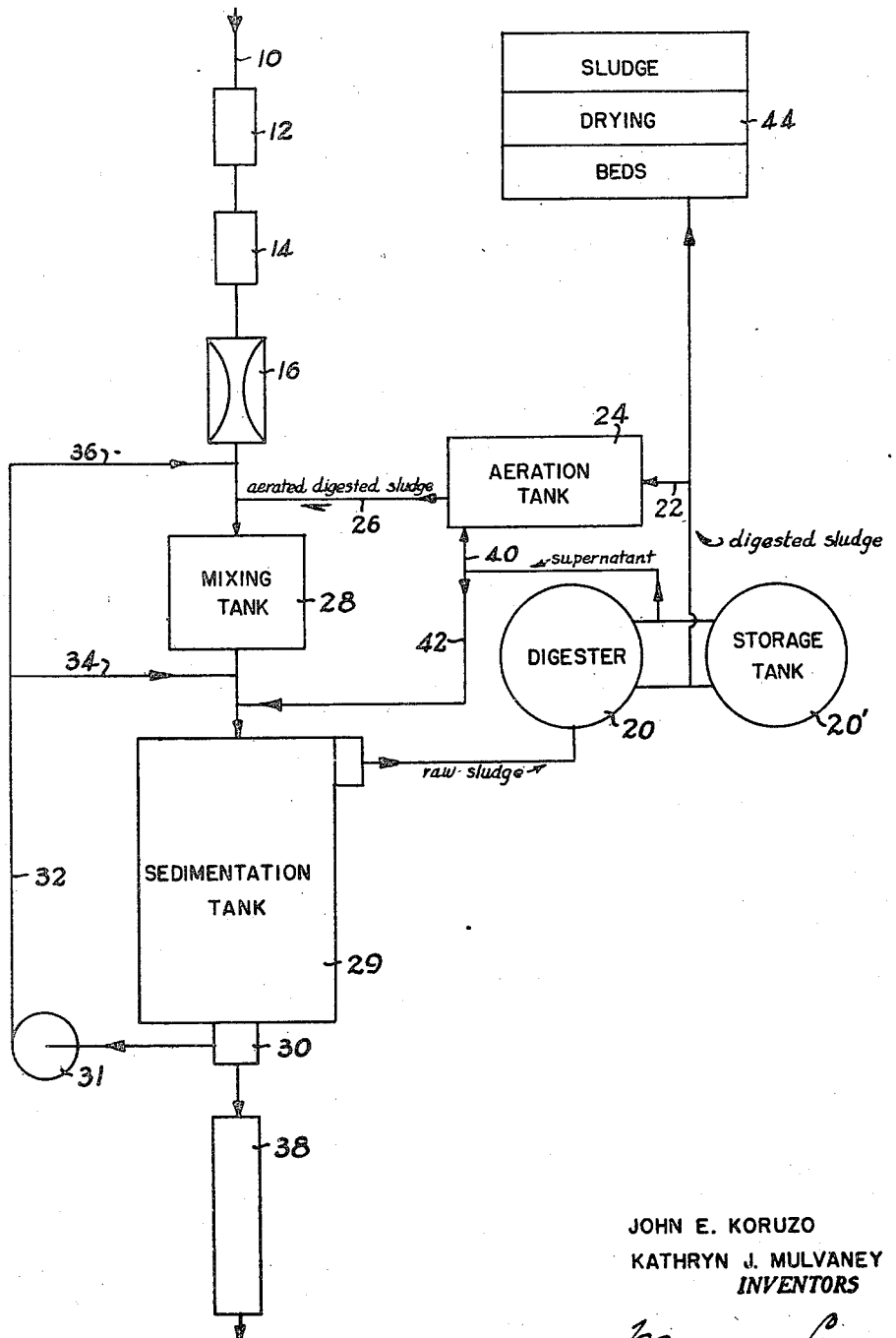

2,442,241

UNITED STATES PATENT OFFICE 2,442,241

SEWAGE TREATMENT PROCESS

John E. Koruzo and Kathryn J. Mulvaney, Atlanta, Ga.

Application August 26, 1946, Serial No. 692,969

5 Claims. (Cl. 210—2)

This invention relates to sewage treatment, and has for its object the provision of a process of sewage treatment enabling substantial savings in construction and operating costs, as compared with present day systems of this type.

Typical practice in modern sewage disposal plants involves a primary or preliminary phase in which the incoming sewage is conveyed to a mechanical screening or grit removal apparatus for the removal of the heavier and more solid materials, and thence to a primary settling tank in which a majority of the settable suspended solids are settled out, and the liquid or non-settable constituents, comprising the "primary effluent," are passed on for secondary treatment by the usual trickling filters, activated sludge apparatus or the like. After such secondary treatment, the primary effluent is usually transmitted to a secondary settling tank where settling again occurs, yielding a secondary effluent which is usually discharged, with or without chlorine or equivalent treatment, into streams or rivers. The sludges from both the primary and secondary settling tanks are then typically digested at an elevated temperature in a sludge digester wherein the organic solid constituents of the sludge are subjected to anaerobic bacterial decomposition, and up to 50% of such solid constituents are thereby converted to liquid or gaseous form. The remaining solids, technically referred to as "digested sludge," are usually spread out upon drying beds for subsequent incineration, use as fertilizer, or the like. The supernatant liquor which is necessarily withdrawn from the digester, contains, besides a certain quantity of suspended solids, a large proportion of oxygen-requiring bacterial organisms which makes it very dangerous to divert such material into natural waterways.

We have discovered that it is possible to accomplish a considerable simplification of all presently known and practiced sewage disposal systems, both from the point of view of the plant installation required and of operational technique, by utilizing the principle that the solids content of any industrial or organic wastes contains the necessary bacterial and chemical characteristics in sufficient concentration to accomplish a complete treatment of such wastes if processed properly and to the correct degree.

It is accordingly an object of our invention to provide a process of sewage treatment which utilizes to a maximum degree the characteristics and constituents of the sewage or waste itself, thereby reducing or eliminating the relatively expensive additions of commercial chemicals or other treatment media. A further object is to provide such a process in which the efficacy of the treatment is such as greatly to reduce, often by more than 50%, the size of mechanical installations required, whereby the cost of operation is still further reduced. A still further object is to provide such a system in which the time required for complete treatment of incoming sewage is substantially reduced, so that a plant of given size is capable of complete treatment of a greater amount of sewage in any given period. An ancillary object is to accomplish the complete stabilization of the treatment system, whereby the ultimate solids and liquids to be disposed of are substantially pure in the physiological sense.

An additional object of our invention is to provide a process of the character described which can be carried out entirely by the use of standard equipment as now used in sewage disposal plants. Indeed, the treatment units required are merely those which present practice denotes as primary or preliminary units, with the addition of a comparatively small digested sludge and supernatant liquor aerator. Our improved process substantially eliminates the need for secondary aeration and final sedimentation tanks, items which represent a substantial portion of the initial cost of known installations.

A further object of our invention is to provide such a process in which the complete sewage treatment—biological, physical and chemical—is accomplished by the use of biological oxygen in the form of ammonia, nitrites and nitrates which are liberated and agglomerated by microbial protoplasms instead of by artificial means. To this end, atmospheric oxygen is utilized to oxygenate at least a portion of the sludge formed in the digester, producing a concentration of bacterial oxygen-bearing compounds which, when added to incoming sewage, sweep out the dissolved and colloidally suspended impurities in the primary sedimentation tank, neutralize excess acidity or alkalinity by buffer action, and catalyze those chemical reactions which result in breaking down the complex molecular structures of animal and vegetable solids, as well as reducing the bio-chemical oxygen demand and rendering the effluents suitable for direct disposal into natural waterways. The invention is thus to be contrasted with known processes which discard the latent bacterial and chemical properties of digested sludge.

The above and other objects and advantages of our invention will best be understood by reference to the following detailed description of a preferred embodiment thereof, taken in connection with the appended drawing, the single figure of which is a flow diagram illustrating the relationships of the various phases in such a process.

Referring now to the drawing, raw sewage enters the system through the usual conduit designated 10 which delivers the sewage to any desired or usual form of grit chamber 12, which operates to remove sand, gravel, cinders or other gritty material which may be injurious to the pumps. Such chamber may be provided with the usual grit washing facilities which operate in a known way to eliminate odor nuisance from this source. From chamber 12 the sewage is conveyed to either coarse or fine bar screens or a comminuter (the latter being shown in the drawing by way of example, and marked 14) whose function is to subdivide all coarse floating matter to a particle size of the order of one-half inch or smaller. Next, the sewage is to pass through any conventional form of metering device, such as a Venturi tube meter, or a constricted throat flume 16, in order to enable the sewage flow to be recorded for use in controlling the inoculant dosing to be described below.

The inoculant dosing constitutes the heart of our novel treatment, and comprises the addition to the raw sewage of a metered quantity (from 50% to 100% of the suspended solids loading of the incoming sewage) of oxidized, digested sludge obtained by the thorough aeration and agitation of the digested sludge obtained from the digester 20. This is accomplished by conveying digested sludge from heated digester 20 through a conduit 22 to an aeration tank 24 where mechanically inducted atmospheric oxygen is applied to it. Aeration tank 24 may be of any modern design, with deflector walls at the top to create a continuous roll of the sludge within the tank, induced by diffused air action. The aeration tubes may be of any standard shape, and are preferably attached to header pipes that can be withdrawn from the tank 24 in case of power failure or for air tube cleaning purposes. The air required may be supplied by any desired type of air induction equipment, associated with the usual meters, gauges and temperature indicators, although it will be understood that the rolling action of the sludge in tank 24 will, of itself, cause some induction of atmospheric oxygen across the surface of the tank, the combined air induction promoting a bacterial build-up within the sludge.

Provision is made for the addition of approximately 25% of liquid to the digested sludge in the aerator tank 24, in order to facilitate proper tank operation. We have shown in the drawing a connection 40 to enable supernatant liquor from digester 20 to be drawn into tank 24 for this purpose, but it is to be understood that the use of such liquor is not essential to the build-up of inoculum, since its function is purely the physical one of dilution so that the sludge in tank 24 may be given the agitation and rolling action described above. Diluting liquor from any suitable source may be used for this purpose; for example, supernatant liquor from the drying beds may be so utilized. For maximum flexibility, the plant could well be provided with connections so that either source of diluting liquor could be used. A connection 42 branching from conduit 40 permits digester supernatant not required in the aeration tank 24 to be diverted into the sedimentation tank 29.

It is important that the aeration tank 24 should be maintained at a temperature of at least 70° F.; the digested sludge being processed will then maintain an average temperature of 85° to 90° F. by thermophylic action which will be conducive to bacterial oxygenation conversion. Under these circumstances, the digested sludge in tank 24 now undergoes an aerobic or oxidizing digestion without any putrefaction, because the anaerobic or putrefactive cycle of digestion has been normally completed in the heated digestion tank 20. During such digestion, the sludge has, by enzymic action, partially split the proteins, fats, carbohydrates and sugars, and has prepared these elements for the aerobic cycle of active oxidation in the aeration tank within a detention period of about two hours. This is possible because of a slow inoculum displacement rate by fresh digested sludge, a predetermined amount of aerated sludge being always retained for aerobic seeding purposes to promote quick oxidation of the added digested sludge, as more particularly pointed out below in a quantitative example of our process.

The initial aeration period will consume from 72 to 144 hours to develop inoculum nitrate values ranging to 300 parts per million. After complete aeration or oxidation, hydrogen-ion concentrations are maintained in a neutral zone, nitrites usually remain at zero and nitrates up to 300 parts per million. The high nitrate values developed are important as bacterial oxygenation sets enzymic action in operation immediately upon inoculum contact with fresh sewage and coordinates the carbonaceous cycle with the nitrogenous cycle by buffer action. Normally, the carbonaceous cycle creates a great immediate oxygen demand, and gradually levels out to a slow normal oxygen demand as it proceeds into the nitrogenous cycle (the bacterial build-up rate depending on time and temperature), to a completely stabilized condition. In this process, oxygenated sludge is built up to such a high degree in the form of nitrate or oxygen-bearing bacterial compounds that its effect is bacterially overpowering immediately on contact with the dissolved and colloidal matter in sewage, hastening the powers of stabilization by supplying a full crew of selected "workmen" developed from, and containing the proportional bacterial and chemical characteristics of, the sewage to be treated. Excess digested sludge that is not utilized as inoculum is wasted to sludge drying beds or to incinerators in accord with normal practice in the art.

The oxygenated digested sludge from the point of inoculation is conveyed through pipe 26 to a mixing tank 28, which may be of any standard form designed to detain the sewage for a period of 10 to 20 minutes at maximum flow, and achieve uniform distribution of inoculant through the sewage; mixing can be accomplished by mechanical stirrers or by a current of air. Thence the inoculated sewage is conveyed to an ordinary sedimentation tank 29 for settling purposes, where the inoculant, with all the adsorbed colloidal matter, and all of the decomposed dissolved organic compounds and absorbed gases, is settled out. Such tank, as is usual, is arranged to gather the sludge to a central pumping sump by flight collector action at the invert of the tank, and scum collector action at the water surface, while the liquid overflows the edge or end of the tank.

At this point, an overflow receiving man-hole or well 30 will be provided with recirculating pump facilities 31 to return final effluent either ahead and/or following the mixing chamber via conduits 32, 34 and/or 36. The capacity of these pumping facilities 31 may range from 10% to 50% of the average design flow, any overflow from tank 29 being relatively clear and capable of flowing to the outfall sewer or to natural waterways after whatever chlorine treatment is required by State or Federal health authorities. The chlorine treating chamber designated 38 in the drawings may economically consist merely of a long pipe with provision for induction of chlorine along its length.

The treatment of the liquid portion of the sewage is now complete, the effluent or overflow from tank 29 leaving the plant in such a condition that the reduction in suspended solids is from 70% to over 95%, and the reduction in bio-chemical oxygen demand is from 65% to over 90%, both figures depending upon the desired operating efficiency of the plant and the percentage of the inoculant, or aerated digested sludge, returned to the raw sewage input. The reduction in B. coli is quantitatively from millions to hundreds, and the effluent is perfectly stabilized and will have no undesired physiological effects.

The accumulated sludge from the settling tank 29 (or from all the settling tanks, if more than one is utilized) should be drawn to a wet well before delivery to the digesters to help water elimination by concentration, and for visual observation of its condition. The sludge from the wet well is then conveyed to heated digester 20 where it undergoes digestion and reduction of solids according to accepted sewage treatment practice. Such sludge contains from 15% to 35% solids from the added processed sludge, and 65% to 95% of solids swept out of the sewage by occlusion and absorption by the processed sludge. Sludge digestion is a matter of time and temperature, years of experience having proven that conventional processes require about 30 days at 90° F. to digest raw sludge when properly seeded by a sufficient amount of completely digested sludge. Under our process, the digesting time is reduced to 20 days at 90° F., and the capacity of the digester remains the same as in standard processes because of the increased solids additions to the raw suspended solids loadings. Thus a reduction of ten days time is achieved. The raw sludge water content is also reduced from 98% to between 85% and 90%, by compaction again due to raw suspended solids loadings, and removes an evaluated 8 to 13 tons of supernatant liquor digester loadings on the same comparative basis. Besides reducing the water content by compaction, the oxidized sludge supplies oxygen values to the anaerobic cycle of digestion by immediate application of nitrite or nitrate values with enzymic action already started to hasten the process of digestion by combining the actions of thermophylic and mesophylic zones of treatment. In 20 days, excess digested sludge (that is, digested sludge not required to be aerated for inoculating incoming sewage) could be drawn to drying beds 44 for air drying and disposal as fertilizer, or to dewatering equipment and incinerators to be eliminated.

The digester 20 is to be equipped, as will be understood, with a floating cover to maintain gas and gas pressure, thus reducing fire hazard and/or permitting its use for heating purposes in accordance with standard practices. A sludge storage tank 20' is provided and connected in parallel with digester 20, to provide additional flexibility of plant operation. It enables digested sludge to be transferred to the aerator at a transiently greater rate than raw sludge is received by digester 20, without upsetting the balance obtaining in the digester.

A quantitative example will now be given of the application of our process to a disposal system designed to handle a total raw sewage load of one million gallons per day, based upon a suspended solids content of 300 parts per million and a B. O. D. (bio-chemical oxygen demand) of 275 parts per million.

Under the above circumstances, there will be 174 tons of water containing 104 pounds of solids delivered to the plant every hour through conduit 10. The inoculum delivered to this raw sewage in the mixing tank, for an inoculation level of 100%, will therefore comprise 104 pounds of inoculum solids per hour, contained in 1.4 tons of water. The aeration tank 24 from which the inoculum is derived should provide for a two-hour aeration period at an air induction rate of six cubic feet per gallon, based on a digested sludge solids content of 120,000 parts per million, while the sedimentation tank 29 should have a holding capacity of 18,000 gallons, or $\frac{1}{56}$ of the system input per day.

The aerated sludge displacement capacity would be 334 gallons per hour from digester 20 to provide an inoculating rate to the raw sewage in the mixing chamber of 6 to 12.5 parts of solids per hour to treat an incoming raw sewage suspended solids loading of 12.5 parts per hour. Approximately 2.2 tons of water containing 440 pounds of solids will be delivered to the aerator for inoculum build-up, while 175 tons of water containing 5 pounds of solids will be eliminated in the plant effluent every hour.

The inoculum build-up period mentioned above for a new plant, or one just being put into operation in accordance with our process, will require from 60 to 90 days to provide an accumulation and thorough digestion of raw sewage solids. In other words, the plant will work for from 60 to 90 days as a partial treatment plant, after which time from 52 to 104 pounds of solids will be transferred from the digester to the aerator each hour, in the steady state.

Some slight increase in solids loading on the sedimentation tank will, of course, result from recirculation of plant effluent through pipe 32, but its effect will be trivial insofar as the solids content of the plant effluent is concerned.

It will be seen from the above description and example that our process satisfies all the objects set out at the beginning of this specification, but we wish it to be understood that the specific details of arrangement may be considerably varied without departing from the spirit of our invention, and we claim all such variations as fall within the scope of the appended claims.

We claim:

1. The method of treating wastes such as sewage which comprises segregating the waste into constituent parts which are predominantly liquid and sludge respectively, anaerobically digesting the sludge portion, withdrawing from the portion undergoing digestion a fraction which has undergone complete anaerobic digestion, and having a solids content in amount to equal at least about 50 percent of the suspended solids content of waste input to the system, mechanically agitating and aerating said fraction to a nitrate value of the order of three hundred parts per million to form an inoculum, inoculating incoming waste with a quantity of said inoculum, and ultimately discarding the liquid and the unused sludge parts.

2. The method of treating sewage or the like comprising segregating said sewage into constituent parts which are predominantly liquid and sludge respectively, anaerobically digesting the sludge portion at a temperature of the order of 90° F. for a period of approximately twenty days, withdrawing from the portion undergoing digestion a fraction which has undergone complete anaerobic digestion and having a solids content in amount equal to at least about 50 percent of the suspended solids content of waste input to the system, diluting said fraction of digested sludge with a sufficient quantity of a liquid to permit mechanical aeration, mechanically agitating and aerating said diluted fraction to form an inoculum, inoculating incoming sewage with a quantity of said inoculum, and ultimately discarding the liquid and the unused sludge parts.

3. The method of treating sewage or the like comprising segregating said sewage into constituent parts which are predominantly liquid and sludge respectively, digesting the sludge portion at a temperature of the order of 90° F. for a period of approximately twenty days, withdrawing from the portion undergoing digestion a fraction which has undergone complete anaerobic digestion and having a solids content in amount equal to at least about 50 percent of the suspended solids content of waste input to the system, mechanically agitating and aerating said diluted fraction to a nitrate value of the order of three hundred parts per million to form an inoculum, inoculating incoming sewage with a quantity of said inoculum, and ultimately discarding the liquid and the unused sludge parts.

4. The method of treating sewage comprising separating at least a portion of said sewage into predominantly liquid and sludge components, continuously anaerobically digesting at least a portion of the sludge, withdrawing a fraction of said sludge which is in a completely digested state, mechanically agitating and aerating said fraction to a nitrate value of the order of three hundred parts per million to form an inoculum, inoculating incoming raw sewage with a quantity of said inoculum and ultimately discarding the liquid and the unused sludge parts.

5. The method of treating wastes such as sewage which comprises segregating the waste into constituent parts which are predominantly liquid and sludge respectively, anaerobically digesting the sludge portion, withdrawing from the portion undergoing digestion a fraction which has undergone complete anaerobic digestion, and having a solids content in amount to equal at least about 50 percent of the suspended solids content of waste input to the system, mechanically agitating and aerating said fraction to a nitrate value of the order of three hundred parts per million to form an inoculum, inoculating incoming waste with a metered quantity of said inoculum in amount not substantially less than 50 percent of the suspended solids content of said waste, and ultimately discarding the liquid and the unused sludge parts.

JOHN E. KORUZO.
KATHRYN J. MULVANEY.

REFERENCES CITED

The following references are of record in the file of this patent:

UNITED STATES PATENTS

| Number | Name | Date |
| --- | --- | --- |
| 2,089,162 | Goudy et al. | Aug. 3, 1937 |
| 2,190,598 | Fischer | Feb. 13, 1940 |
| 2,228,017 | Pecker | Jan. 7, 1941 |
| 2,254,953 | Thomas | Sept. 2, 1941 |
| 2,349,390 | Tolman | May 23, 1944 |
| 2,359,004 | Schlenz et al. | Sept. 26, 1944 |
| 2,404,223 | Durgin | July 16, 1946 |

FOREIGN PATENTS

| Number | Country | Date |
| --- | --- | --- |
| 218,399 | Great Britain | June 27, 1924 |